(12) United States Patent
Stamoulis et al.

(10) Patent No.: US 7,962,148 B2
(45) Date of Patent: Jun. 14, 2011

(54) CONTROLLING AND MANAGING ACCESS TO MULTIPLE NETWORKS

(75) Inventors: Anastasios Stamoulis, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/165,081

(22) Filed: Jun. 23, 2005

(65) Prior Publication Data
US 2006/0019653 A1    Jan. 26, 2006

Related U.S. Application Data

(60) Provisional application No. 60/589,897, filed on Jul. 20, 2004, provisional application No. 60/675,337, filed on Apr. 26, 2005.

(51) Int. Cl.
*H04W 72/00* (2009.01)

(52) U.S. Cl. ............ 455/453; 455/435.1; 455/436; 455/425; 455/552.1; 455/41.2; 370/338; 370/329; 370/331; 370/352

(58) Field of Classification Search ......... 455/423–452.2, 455/67.11, 552.1, 560, 453; 370/331–333, 370/338; 375/225
See application file for complete search history.

(56) References Cited

U.S. PATENT DOCUMENTS

| | | | |
|---|---|---|---|
| 5,497,504 A * | 3/1996 | Acampora et al. ............ 455/436 |
| 6,097,953 A * | 8/2000 | Bonta et al. .................... 455/436 |
| 6,122,514 A | 9/2000 | Spaur et al. .................... 455/448 |
| 6,366,780 B1 * | 4/2002 | Obhan ............................ 455/453 |
| 6,522,881 B1 | 2/2003 | Feder et al. |
| 6,629,286 B1 | 9/2003 | Berens et al. |
| 6,725,044 B2 * | 4/2004 | Verma et al. ................... 455/444 |
| 6,850,764 B1 * | 2/2005 | Patel .............................. 455/450 |
| 6,870,822 B2 | 3/2005 | Balogh |
| 6,907,243 B1 * | 6/2005 | Patel .............................. 455/442 |
| 6,978,137 B2 * | 12/2005 | Gwon et al. ................... 455/436 |
| 7,082,301 B2 * | 7/2006 | Jagadeesan et al. ........... 455/436 |
| 7,089,033 B2 * | 8/2006 | Leinonen et al. ........... 455/553.1 |
| 7,149,533 B2 * | 12/2006 | Laird et al. ................. 455/456.3 |
| 7,162,250 B2 * | 1/2007 | Misra ............................. 455/453 |
| 7,197,318 B2 * | 3/2007 | Schwarz et al. ............... 455/453 |
| 7,277,446 B1 * | 10/2007 | Abi-Nassif et al. ............ 370/412 |

(Continued)

FOREIGN PATENT DOCUMENTS

CL      1822-2005      7/2005

(Continued)

OTHER PUBLICATIONS

International Search Report and Written Opinion—PCT/US05/025804, International Searching Authority—European Patent Office, Nov. 24, 2005.

(Continued)

*Primary Examiner* — Sharad Rampuria
(74) *Attorney, Agent, or Firm* — Florin Corie

(57) ABSTRACT

The disclosure is directed to a mobile communication device, and method for registering with a network from a mobile communications device. A processor in the mobile device may be used to establish a network connection with a server in a network. The mobile device may also include a transceiver that receives information from the server relating to the network connection. The processor may use the information, local measurements, or both to determine whether to register with the network.

21 Claims, 3 Drawing Sheets

U.S. PATENT DOCUMENTS

| | | | |
|---|---|---|---|
| 7,318,111 B2* | 1/2008 | Zhao | 709/250 |
| 7,328,027 B1* | 2/2008 | Mangal | 455/453 |
| 7,336,960 B2* | 2/2008 | Zavalkovsky et al. | 455/453 |
| 7,346,357 B1* | 3/2008 | Kim et al. | 455/453 |
| 7,392,055 B2* | 6/2008 | Li et al. | 455/452.2 |
| 7,400,901 B2* | 7/2008 | Kostic et al. | 455/525 |
| 7,406,319 B2* | 7/2008 | Kostic et al. | 455/453 |
| 7,437,157 B1* | 10/2008 | Satapathy | 455/435.1 |
| 7,509,129 B2* | 3/2009 | Sinivaara | 455/453 |
| 7,529,203 B2* | 5/2009 | Bajic et al. | 370/328 |
| 2001/0024953 A1 | 9/2001 | Balogh | |
| 2003/0139197 A1 | 7/2003 | Kostic et al. | |
| 2004/0260805 A1 | 12/2004 | Aoyama et al. | |
| 2005/0043026 A1* | 2/2005 | Brok et al. | 455/434 |
| 2009/0170519 A1* | 7/2009 | Wilhoite et al. | 455/436 |

FOREIGN PATENT DOCUMENTS

| | | |
|---|---|---|
| CL | 1824-2005 | 7/2005 |
| CL | 1825-2005 | 7/2005 |
| EP | 1395076 A1 | 4/2003 |
| EP | 1395077 A1 | 4/2003 |
| GB | 2389005 A | 11/2003 |
| JP | 2001298167 | 10/2001 |
| JP | 2003134550 | 5/2003 |
| JP | 2003-264870 | 9/2003 |
| JP | 2004456515 | 2/2004 |
| JP | 2004-517574 | 6/2004 |
| RU | 2202153 C2 | 4/2003 |
| WO | WO9523487 A1 | 8/1995 |
| WO | 2004034648 | 4/2004 |
| WO | WO2004/034723 A2 | 4/2004 |

OTHER PUBLICATIONS

International Preliminary Report on Patentability—PCT/US05/025804, IPEA/US, Jan. 24, 2007.

* cited by examiner

CONTROLLING AND MANAGING ACCESS TO MULTIPLE NETWORKS

CROSS REFERENCE TO RELATED APPLICATIONS

This application claims priority to U.S. Provisional Patent Application Ser. No. 60/589,897 filed on Jul. 20, 2004 and U.S. Provisional application 60/675,337 filed on Apr. 26, 2005, which are incorporated herein by reference in their entirety.

BACKGROUND

1. Field

The present disclosure relates generally to telecommunications, and more particularly, to systems and methods for controlling and managing access to multiple networks in a wireless communications system.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks. However, before a mobile communications device traveling through a wide area cellular network switches to a wireless LAN, certain parameters should be met to ensure that the service quality is not reduced to an unacceptable level.

SUMMARY

One aspect of a mobile communications device is disclosed. The mobile communications device includes a processor configured to establish a network connection with a server in a network, and a transceiver configured to provide information received from the server to the processor, the information relating to the network connection. The processor is further configured to determine whether to register with the network based on the information.

Another aspect of a mobile communications device is disclosed. The mobile communications device includes a processor configured to establish a network connection with a server in a network, and measure at least one of delay, jitter, or packet loss over the network connection in the forward direction. The processor is further configured to determine whether to register with the network based on said at least one measurement.

One aspect of a method of communicating with a network from a mobile communications device is disclosed. The method includes establishing a network connection with a server in a network, receiving information from the server relating to the network connection, and determining whether to register with the network based on the information.

Another aspect of a method of communicating with a network from a mobile communications device is disclosed. The method includes establishing a network connection with a server in a network, measuring at least one of delay, jitter, or packet loss over the network connection in the forward direction, and determining whether to register with the network based on said at least one measurement.

A further aspect of a mobile communications device is disclosed. The mobile communications device includes means for establishing a network connection with a server in a network, means for receiving information from the server relating to the network connection, and means for determining whether to register with the network based on the information.

Yet a further aspect of a mobile communications device is disclosed. The mobile communications device includes means for establishing a network connection with a server in a network, means for measuring at least one of delay, jitter, or packet loss over the network connection in the forward direction, and means for determining whether to register with the network based on said at least one measurement.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, techniques will be described for selecting a network in a multiple network environment. A number of techniques will be described in the context of a mobile communications device traveling through a wide area cellular network with one or more wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching between a CDMA2000 1x network and a GSM network. Alternatively, these techniques may be applied to a mobile communications device capable of accessing a single network, such as a IEEE 802.11 phone. The IEEE 802.11 phone may be configured to connect to the wireless LAN only if certain parameters indicate that the service quality is acceptable. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1:
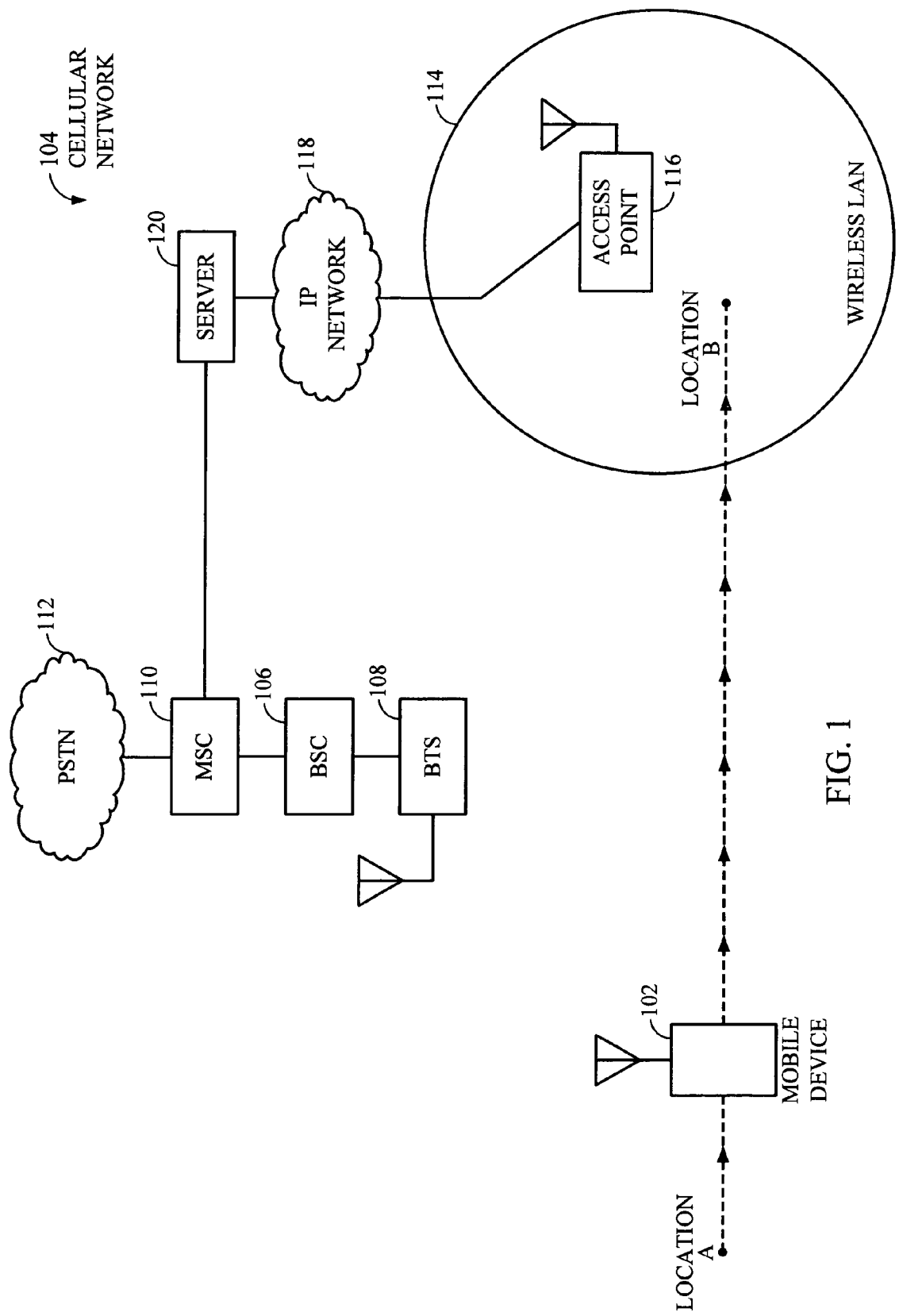
FIG. 1 is a conceptual block diagram of an embodiment of a wireless communications system.

FIG. 1 is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

The mobile device 102 is initially shown in location A in FIG. 1. As the mobile device 102 moves through the cellular network 104 from location A to location B, it comes within the coverage region of a wireless LAN 114. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it registers with either the cellular network 104 or the wireless LAN 114. "Registration" refers to a process whereby the mobile device 102 tells the MSC 110 to route calls from the PSTN 112 through a particular network. The decision to register with a particular network may vary depending on the specific application and overall design constraints. By way of example, the mobile device 102 may be configured to register with the wireless LAN 114 if the service quality is acceptable. By routing all calls to the mobile device 102 through the wireless LAN 114, valuable cellular bandwidth may be freed up for other mobile users. The service quality of the wireless LAN 114 may be determined by the mobile device 102 based on local measurements and information from the server 120. If the service quality over the wireless LAN 114 cannot be maintained at an acceptable level, the mobile device 102 will register with the cellular network 104. In mobile devices without cellular capability, local measurements and information from the server 120 may be used to determine whether the mobile device 102 should register with the wireless LAN 114 or remain idle until the service quality is acceptable.

The registration process begins with the mobile device 102 attempting to access the wireless LAN 114 when power is first applied. Any suitable access procedure may be employed by the mobile device 102. By way of example, the mobile device 102 may use a passive access procedure in which the mobile device 102 searches for a beacon from the access point 116. The beacon is a periodic signal transmitted by the access point 116 with synchronization information. Alternatively, the mobile device 102 may use an active access procedure in which the mobile device 102 transmits a probe and waits for a response from the access point 116.

In the event that the mobile device 102 cannot access a wireless LAN, which might be the case if power is applied to the mobile device 102 at location A, then the mobile device 102 attempts to access the cellular network 104. The mobile device 102 may access the cellular network 104 by acquiring a pilot signal from the BTS 108. Once the mobile device 102 acquires the pilot signal, a radio connection may be established between the two by means well known in the art. The radio connection may be used by the mobile device 102 to register with the MSC 110.

As the mobile device 102 moves through the cellular network 104 from location A to location B in the depicted embodiment, it begins to detect a beacon from the access point 116. Once the mobile device 102 detects the beacon, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 120 over the cellular network 104. With the IP address, the mobile device 102 can establish a network connection with the server 120. The term "network connection" refers not only to the network layer connection between the mobile device 102 and the server 120, but also the lower layer connections required to support the network connection, including the physical layer connections. Once the network connection is established, information from the server 120 can be used in conjunction with local measurements to determine whether to update its registration with the MSC 110 so that future calls are routed through the wireless LAN 114.

Figure 2:
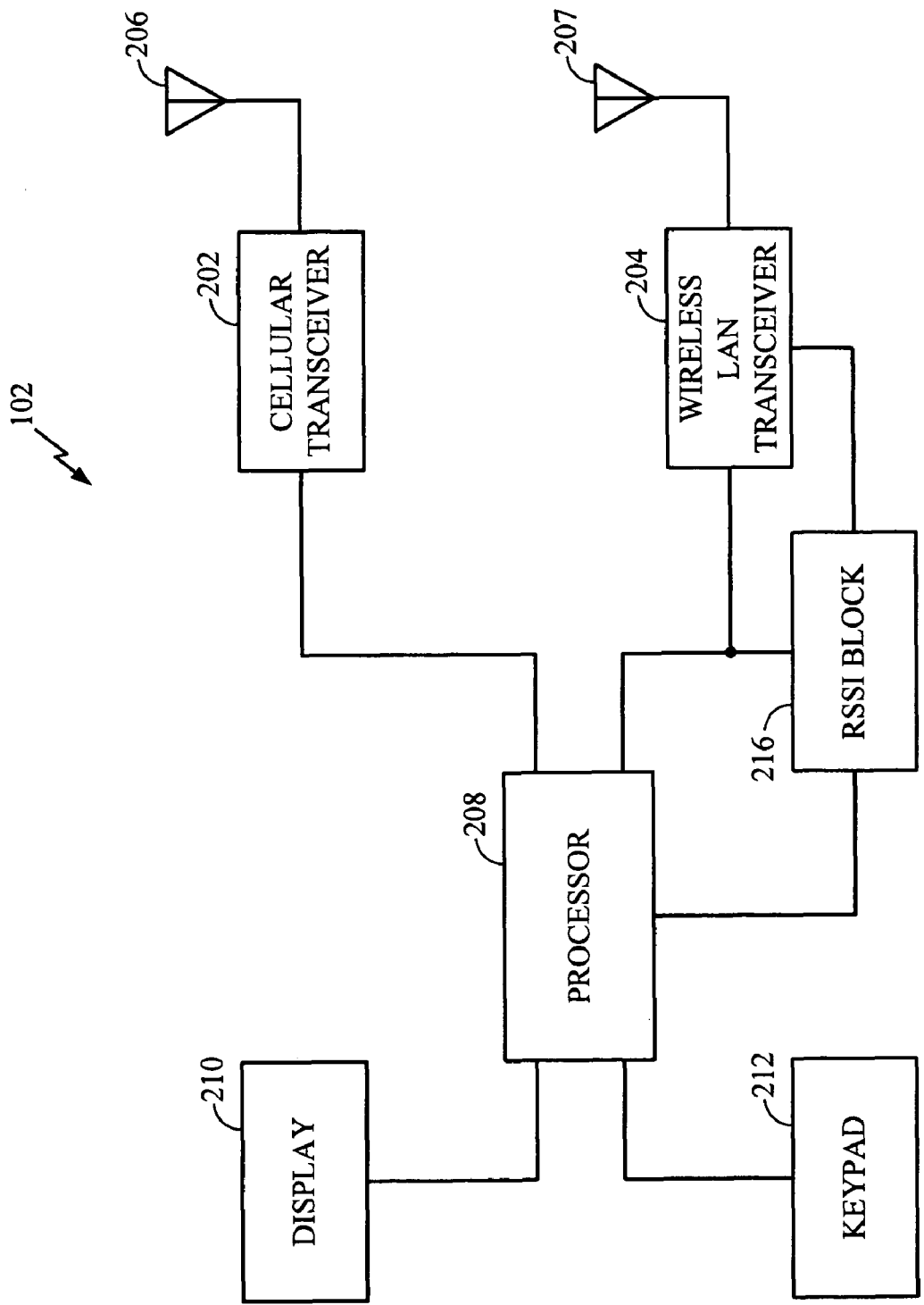
FIG. 2 is a functional block diagram illustrating an example of a mobile device capable of supporting both cellular and wireless LAN communications.

FIG. 2 is a functional block diagram illustrating an example of a mobile device capable of supporting both cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular or wireless LAN technologies. Each transceiver 202, 204 is shown with a separate antenna 206, 207, respectively, but the transceivers 202, 204 could share a single broadband antenna. Each antenna 206, 207 may include one or more radiating elements.

The mobile device 102 is also shown with a processor 208 coupled to both the cellular transceiver 202 and the wireless LAN transceiver 204, however, separate processors may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, modulation and spread-spectrum processing. The DSP may also perform vocoder functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

The processor 208 may be configured to execute a selection algorithm. The selection algorithm may be used to determine whether the mobile device 102 should register with the cellular network or the wireless LAN. The selection algorithm may be implemented as one or more software applications supported by the microprocessor based architecture discussed earlier. Alternatively, the selection algorithm may be a separate module from the processor 208 implemented in hardware, software, firmware, or any combination thereof. Depending on the specific design constraints, the selection algorithm could be integrated in any entity in the mobile device 102, or distributed across multiple entities in the mobile device 102.

The criteria used by the selection algorithm may vary depending on the specific implementation. As discussed above, the criteria may include local measurements made by the mobile device and information provided by the server. Referring to FIG. 1, these local measurements may include various quality metrics which indicate the quality of the network connection. By way of example, the mobile device 102 may measure the signal strength of the transmission from the access point 116. In telephony applications, delay, jitter and packet loss measurements may be used as additional quality metrics relating to the network connection in the forward direction. "Forward direction" refers to transmissions over the network connection from the server 120 to the mobile device 102, and "reverse direction" refers to transmissions over the network connection from the mobile device 102 to the server 120. The information provided by the server 120 may include data that indicates the loading on the access point 116, historical information relating to the performance of the access point 116, quality metrics such as delay, jitter, and packet loss in the reverse direction, or any other information that bears on the quality of the network connection.

Referring to FIGS. 1 and 2, the signal strength from the access point may be measured at the mobile device 102 with a received signal strength indicator (RSSI) block 216. The RSSI is most likely an existing signal that is fed back to the wireless LAN transceiver 202 for automatic gain control, and therefore, can be provided to the processor 208 without increasing circuit complexity of the mobile device 102. Alternatively, the quality of the radio connection may be determined from the beacon. Since the beacon is a spread-spectrum signal that is known, a priori, a replica of the beacon can be stored in memory (not shown) at the mobile device 102. The demodulated beacon may be used with the replica beacon stored in memory to estimate the energy of the transmitted beacon by means well known in the art.

The selection algorithm may also be used to compute various quality metrics relating to the network connection in the forward direction. As indicated earlier, one of these quality metrics is the delay across the network connection in the forward direction. In telephony applications, excessive delay may result in poor quality due to undesirable echoes or talker overlap. The selection algorithm may be configured to measure the delay by any suitable means. In at least one embodiment of the wireless communications system, date and time stamps may be used with the beacon and control signals transmitted from the server 120 to measure delay across the network connection. More specifically, when a forward direction transmission is received by the mobile device 102, the time stamp can be extracted in the processor 208 and compared to a local clock internal (not shown) in the mobile device 102. The result, which represents the delay over the network connection in the forward direction, may be stored in memory (not shown). The selection algorithm may determine whether to register with the wireless LAN 114 using the delay value stored memory for the most recent transmission, or alternatively, the average delay from multiple delay values.

The use of time stamps to measure delay across the network connection requires that the local clock be synchronized with the server 120. A remote time source (not shown) may be used to synchronize the mobile device 102 to the server 120. The remote time source may be one of numerous servers in the IP network 118 that are synchronized to Universal Time Coordinated (UTC) via radio, satellite, modem, or other means. The remote time source may be used to provide time information to update or synchronize the internal clock in the mobile device 102. This may be achieved with a software program known as Network Time Protocol (NTP). NTP is an Internet standard protocol for synchronizing clocks to some time reference. NTP may be run in the processor 208, or elsewhere in the mobile device 102.

The problems with delay in telephony applications may be further compounded by the need to remove jitter. Jitter is the variation in the delay of packets due to network congestion, timing drift, or route changes. Removing jitter requires buffering arriving packets so that all the packets can be continuously played in the correct order. The process of buffering packets adds additional delay. Thus, the algorithm may be further configured to measure the jitter over the network connection in the forward direction as an additional quality metric. In the case of an adaptive jitter buffer, which adapts to changes in the network's delay, the delay measured by the selection algorithm may include network jitter, depending on where the measurement is made in the processing path. In the case of a fixed jitter buffer, which introduces a fixed delay to the packet, the selection algorithm may decide to measure the network jitter from the variations in the delay values stored in memory. The selection algorithm may determine whether to register with the wireless LAN 114 using the worst case variation of delay values, the average variation of delay values, or any other suitable computational methodology.

Lost packets can be especially problematic in telephony applications. Because IP networks do not guarantee service, they will usually exhibit a high incidence of lost packets. In IP networks, voice packets are treated the same as data. As a result, voice packets will be dropped equally with data packets when the IP network is heavily congested. Unlike data packets, however, lost voice packets cannot be simply retransmitted at a later time. The selection algorithm may also be used to compute a quality metric relating to lost packets by any suitable means. By way of example, the beacon and control signals transmitted from the server 120 can also include sequence numbers, in addition to time and date stamps. When the forward direction transmission is received by the mobile device 102, the sequence numbers can be extracted in the processor 208 and used by the selection algorithm. Based on the sequence numbers, the selection algorithm can determine which packets have been lost.

In addition to the quality metrics described above, the selection algorithm may use information from the server 120 to determine whether to register with the wireless LAN 114. As described earlier, the information may be related to the loading on the access point 116. Although the wireless LAN 114 utilizes a wide spectrum to support communications, the overhead may limit the number of mobile users that can be supported by the access point 116. Moreover, the presence of other mobile users in the vicinity of the wireless LAN 114 may put additional loading on the access point 116. The server 120 may be configured to maintain a database which includes every mobile user that has registered with the wireless LAN 114 via the access point 116. When a new mobile device 102 establishes a network connection, the server 120 may access the database to determine how many mobile users currently registered with the wireless LAN 114 are using the access point 116. This information may be provided to the selection algorithm in the mobile device 102 over the network connection. The selection algorithm may use this information to determine whether to register with the wireless LAN 114.

The information provided by the server 120 to the mobile device 102 may also include historical information about the access point 116. By way of example, the server 120 can monitor the number of dropped calls by the access point 116 by means well known in the art. This information can be stored in the server's database and transmitted to the mobile device 102 once a network connection is established. The selection algorithm in the mobile device 102 may use the information to assist it in evaluating the loading at the access point 116. If there is a high incidence of dropped calls by the access point 116, the selection algorithm may decide to register with the wireless LAN 114 only if the access point is lightly loaded. Conversely, if the incidence of dropped calls is low, the selection algorithm may take a more aggressive approach and decide to register with the wireless LAN 114 even if the access point 116 is heavily loaded.

The server 120 may also be used to compute various quality metrics relating to the network connection in the reverse direction. These quality metrics may include delay, jitter, lost packets, and any other parameters that bear on the quality of the network connection. The server 120 may compute these quality metrics in the same manner described above in connection with the selection algorithm, or by any other suitable means. To the extent delay or jitter is computed using date and time stamps with the control signals transmitted from the mobile device 102 over the network connection, NTP may be used by the server 120 to synchronize its internal clock. Sequence numbers embedded in the control signals by the mobile device 102 may also be used by the server 120 to identify lost packets. These quality metrics may be used by the selection algorithm in the mobile device 102. These quality metrics may be used in conjunction with the quality metrics measured by the selection algorithm to provide a complete picture of the network connection in both the forward and reverse directions.

Figure 3:
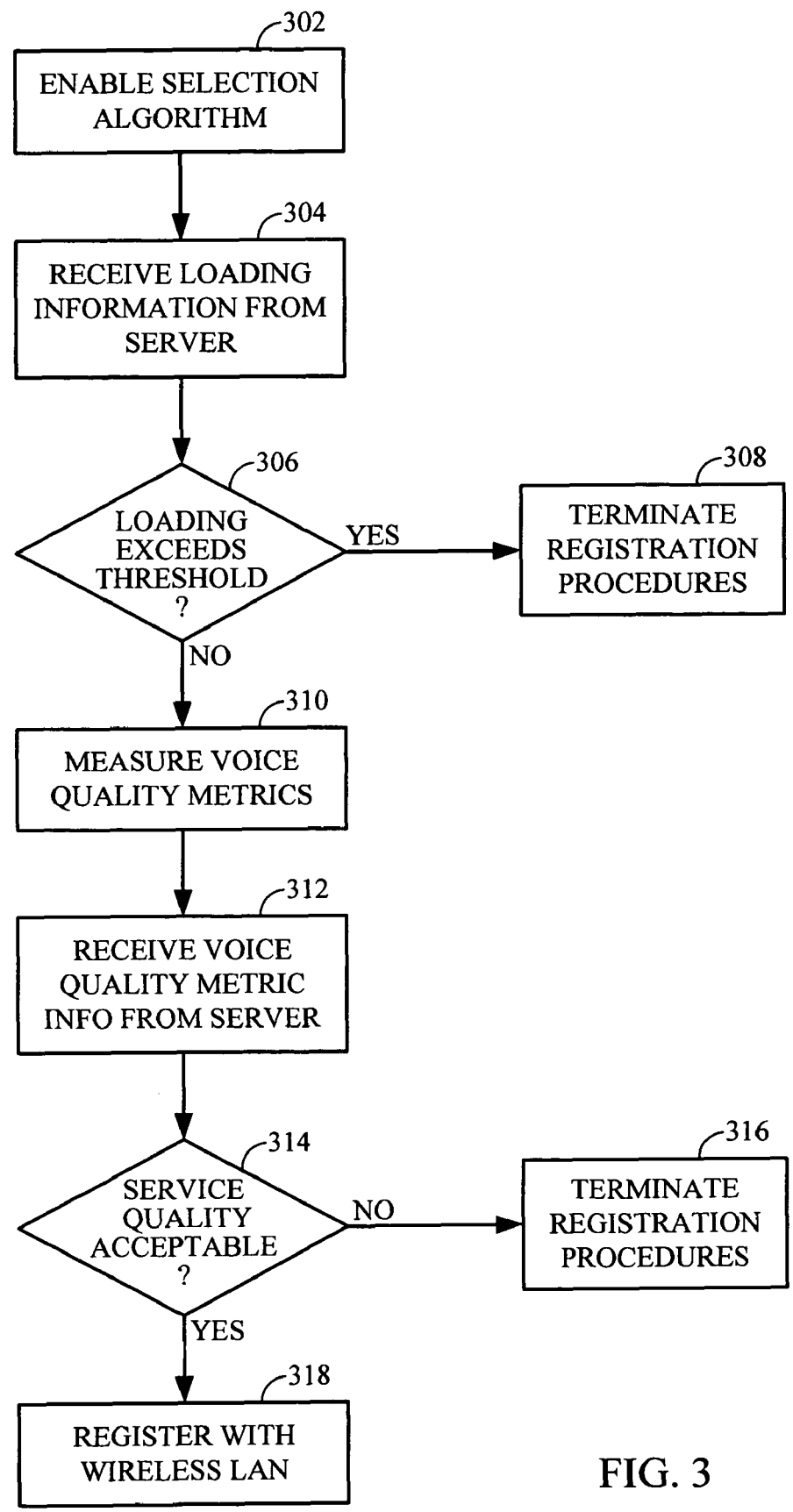
FIG. 3 is a flow diagram illustrating the functionality of a selection algorithm in the mobile device for registering with a network.

FIG. 3 is a flow diagram illustrating the functionality of the selection algorithm in the mobile device. In step 302, the selection algorithm is enabled once a network connection is established between the mobile device and the server. The select algorithm remains idle until it receives information from the server in step 304. In this example, the information indicates the loading on the access point. In step 306, the selection algorithm determines whether the loading on the access point exceeds a threshold. If the selection algorithm determines that the loading of the access point exceeds the threshold, then it terminates registration procedures with the wireless LAN in step 308. In the case where the mobile device is capable of both cellular and wireless LAN operation, the mobile device registers with the cellular network. In the case where the mobile device is capable of only wireless LAN operation, the mobile device remains idle until the loading on the access point is reduced. The threshold may be generated in the mobile device, or alternatively, provided to the mobile device from the server over the network connection. In the either case, the threshold may be adjustable based on historical information stored in the server's database.

Assuming the mobile device determines that the loading on the access point does not exceed the threshold, the registration procedure continues. In step 310, the selection algorithm measures various quality metrics relating to the network connection in the forward direction. The selection algorithm also receives information from the server in step 312. The information from the server may include various quality metrics relating to the network connection in the reverse direction. The quality metrics are evaluated by the selection algorithm in step 314. If the quality metrics indicate a service quality that is unacceptable, then the selection algorithm terminates registration procedures in step 316. The operation of the mobile device after the registration procedures are terminated is again dependent upon the type of device that is being employed. Conversely, if the quality metrics indicate a service quality that is acceptable, then the selection algorithm completes the registration process with the wireless LAN in step 318.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile communications device, comprising:
a processor configured to establish a communication with a server in a network;
a transceiver configured to establish a wireless network connection with an access point associated with the network, and provide information related to the network connection received from the server to the processor, wherein the information comprises a communication load on the access point and a historical network connection quality metric corresponding to the access point; and
wherein the processor is further configured to determine whether to register with the network based on the information, wherein the processor is configured to register with the network when the historical network connection quality metric meets an unacceptable quality threshold only if the communication load meets a low load threshold, and wherein the processor is configured to register with the network when the communication load meets an unacceptable load threshold only if the historical network connection quality metric meets a high quality threshold.

2. The mobile communications device of claim 1, wherein the historical network connection quality metric relates to delay, jitter, or packet loss over the network connection in a reverse direction.

3. The mobile communications device of claim 1, wherein the processor is further configured to measure signal strength of wireless transmissions from the access point, and to determine whether to register with the network based on both the information received from the server and the measured signal strength.

4. The mobile communications device of claim 1 further comprising a second transceiver, and wherein the processor is further configured to register with a second network through the second transceiver if it determines not to register with the network.

5. The mobile communications device of claim 4 wherein the transceiver comprises an IEEE 802.11 transceiver, and the second transceiver comprises a cellular transceiver, and wherein the processor is further configured to use the network to support cellular services if it determines to register with the network.

6. A method of communicating with a network from a mobile communications device, comprising:
employing at least one processor to execute computer executable instructions stored on at least one computer readable medium to perform the following acts:
establishing communication with a server in a network;
establishing a wireless network connection with an access point associated with the server;
receiving information from the server relating to the network connection, wherein the information comprises a communication load on the access point and a historical network connection quality metric corresponding to the access point; and
determining whether to register with the network based the information, wherein the determining results in registering with the network when the historical network connection quality metric meets an unacceptable quality threshold only if the communication load meets a low load threshold, and wherein the determining results in registering with the network when the communication load meets an unacceptable load threshold only if the historical network connection quality metric meets a high quality threshold.

7. The method of claim 6, wherein the historical network connection quality metric comprises at least one of delay, jitter, or packet loss over the network connection in a reverse direction.

8. The method of claim 6, the employing including employing at least one processor to execute the computer executable instructions to further perform:
registering the network; and
providing cellular services over the network connection;
wherein the network comprises an IEEE 802.11 network.

9. A mobile communications device, comprising:
means for establishing communication with a server in a network;
means for establishing a wireless network connection with an access point associated with the server;
means for receiving information from the server relating to the network connection, wherein the information comprises a communication load on the access point and a historical network connection quality metric corresponding to the access point;
means for determining whether to register with the network based on the information, wherein the determining results in registering with the network when the historical network connection quality metric meets an unacceptable quality threshold only if the communication load meets a low load threshold, and wherein the determining results in registering with the network when the communication load meets an unacceptable load threshold only if the historical network connection quality metric meets a high quality threshold; and wherein instructions associated with one or more of the above means are executed by one or more processors operatively coupled to one or more memory devices.

10. The mobile communications device of claim 9, wherein the means for receiving information comprises means for receiving a quality metric relating to delay, jitter, or packet loss over the network connection in a reverse direction.

11. A non-transitory computer readable medium having stored thereon computer-executable instructions that, if executed by a system, cause the system to perform the method of claim 6.

12. The non-transitory computer readable medium of claim 11, stored wherein the historical network connection quality metric comprises at least one of delay, jitter, or packet loss over the network connection in a reverse direction.

13. The non-transitory computer readable medium of claim 11, having stored thereon computer-executable instructions that, if executed by a system, cause the system to perform registering with the network, wherein the registering causes a mobile switching center (MSC) to direct calls for the mobile communication device from a public switched telephone network (PSTN) through the network connection.

14. The mobile communications device of claim 2, wherein the processor is further configured to measure at least one of delay, jitter, or packet loss over the network connection in a forward direction, and to determine whether to register with the network based on both the information received from the server and the at least one measurement.

15. The mobile communications device of claim 1, wherein the processor is further configured to perform registering with the network, wherein the registering causes a mobile switching center (MSC) to direct calls for the mobile communication device from a public switched telephone network (PSTN) through the network connection.

16. The method of claim 7, wherein the employing includes employing at least one processor to execute the computer executable instructions to further perform:

measuring at least one of delay, jitter, or packet loss over the network connection in a forward direction, and wherein the determining of whether to register with the network is based on both the information received from the server and the at least one measurement.

17. The method of claim 6, wherein the employing includes employing at least one processor to execute the computer executable instructions to further perform:

measuring signal strength of wireless transmissions from the access point, and wherein the determining whether to register with the network is based on both the information received from the server and the measured signal strength.

18. The method of claim 6, wherein the employing includes employing at least one processor to execute the computer executable instructions to further perform:

registering with the network, wherein the registering causes a mobile switching center (MSC) to direct calls for the mobile communication device from a public switched telephone network (PSTN) through the network connection.

19. The mobile communications device of claim 10, wherein the historical network connection, quality metric comprises at least one of delay, jitter, or packet loss over the network connection in a reverse direction.

20. The mobile communications device of claim 9, further comprising means for measuring signal strength of wireless transmissions from the access point, and wherein the determining whether to register with the network is based on both the information received from the server and the measured signal strength.

21. The mobile communications device of claim 9, further comprising means for registering with the network, wherein the registering causes a mobile switching center (MSC) to direct calls for the mobile communication device from a public switched telephone network (PSTN) through the network connection.

* * * * *